(12) United States Patent
Kato (10) Patent No.: US 8,517,548 B2
(45) Date of Patent: Aug. 27, 2013

(54) EDGE LIGHTING DIAL STRUCTURE

(75) Inventor: Takahira Kato, Kariya (JP)

(73) Assignees: DENSO International America, Inc., Southfield, MI (US); Denso Corporation, Kariya-shi (JP)

( * ) Notice: Subject to any disclaimer, the term of this patent is extended or adjusted under 35 U.S.C. 154(b) by 316 days.

(21) Appl. No.: 12/751,167

(22) Filed: Mar. 31, 2010

(65) Prior Publication Data

US 2011/0242789 A1    Oct. 6, 2011

(51) Int. Cl.
*G01K 1/06*    (2006.01)

(52) U.S. Cl.
USPC ................. 362/23.01; 362/23.13; 362/23.17

(58) Field of Classification Search
USPC ............. 362/23, 24, 26–30, 86–88, 326, 327, 362/330, 331, 482, 489, 509–511, 545, 606–608, 362/611–613, 615, 616–620, 623–626, 800
See application file for complete search history.

(56) References Cited

U.S. PATENT DOCUMENTS

| | | | | |
|---|---|---|---|---|
| 2,831,453 A | * | 4/1958 | Hardesty | 116/288 |
| 5,291,851 A | * | 3/1994 | Muramatsu | 116/286 |
| 6,640,743 B2 | * | 11/2003 | Nakane | 116/286 |
| 7,048,397 B2 | * | 5/2006 | Birman | 362/26 |
| 7,357,096 B2 | * | 4/2008 | Tane | 116/288 |
| 2008/0105191 A1 | | 5/2008 | Kato | |
| 2008/0197258 A1 | | 8/2008 | Werman et al. | |
| 2008/0209748 A1 | | 9/2008 | Kato | |
| 2009/0223436 A1 | | 9/2009 | Werman et al. | |
| 2011/0044021 A1 | * | 2/2011 | Kato | 362/30 |

FOREIGN PATENT DOCUMENTS

| | | | |
|---|---|---|---|
| GB | 2237385 A | * | 5/1991 |
| JP | 2006-220478 | | 8/2006 |
| JP | 2006-267081 | | 10/2006 |

* cited by examiner

*Primary Examiner* — Hargobind S Sawhney (74) *Attorney, Agent, or Firm* — Harness, Dickey & Pierce, P.L.C.

(57) ABSTRACT

An instrument includes a transparent dial and a light source. The transparent dial includes an indicia, a graduation, and first and second surfaces, wherein the first and second surfaces are parallel to each other, and wherein the second surface is closer than the first surface to a viewer of the instrument. The light source provides light through the transparent dial to project the indicia and the graduation to a location that is closer than the second surface to the viewer of the instrument.

21 Claims, 6 Drawing Sheets

EDGE LIGHTING DIAL STRUCTURE

FIELD

The present disclosure relates to an instrument of an instrument cluster and more specifically to illumination of an instrument.

BACKGROUND

This section provides background information related to the present disclosure which is not necessarily prior art.

Instrument clusters within vehicles may include a collection of instruments for displaying operational information such as vehicle speed, engine RPM, engine temperature, fuel level, alternator output and other information related to driving or vehicle component status. Vehicle instruments may include analog or digital readings for displaying information depending upon manufacturer and styling preferences. An analog instrument typically includes a face having indicia such as numbers, graduations to demark the indicia and a pointer for rotating to the graduations.

One design consideration for an instrument cluster and associated instruments is the ability of a vehicle operator to easily view and read the instruments in all driving environments. In particular, nighttime driving requires the instrument cluster to illuminate in some fashion such that the numbers and indicia are quickly and easily discernible. One method of making the instrument cluster more quickly easily discernible is to use three-dimensional (3D) instrument faces; however, such 3D instrument faces have not been without their share of problems.

For instance, graduations and indicia of instruments may protrude above the instrument face thereby creating an instrument that may not be quickly readable because of the quantity of 3D parts. Still yet, pressed sheets traditionally used to form instrument faces may not be producible with sharp corners and sharp edges, and thus when illuminated, such faces do not provide a desirable lighted, 3D appearance. What is needed then is a device that does not suffer from the above disadvantages.

SUMMARY

This section provides a general summary of the disclosure, and is not a comprehensive disclosure of its full scope or all of its features.

An instrument includes a transparent dial and a light source. The transparent dial includes an indicia, a graduation, and first and second surfaces, wherein the first and second surfaces are parallel to each other, and wherein the second surface is closer than the first surface to a viewer of the instrument. The light source provides light through the transparent dial to project the indicia and the graduation to a location that is closer than the second surface to the viewer of the instrument.

An instrument located in a dash of a vehicle includes a transparent dial, a light-emitting diode (LED), and a projection control device. The transparent dial includes a plurality of indicia and a plurality of graduations on a first surface of the transparent dial. The LED emits light perpendicular to an outer edge of the transparent dial, wherein the LED is located at the outer edge of the transparent dial. The projection control device captures and steers the emitted light to project the plurality of indicia and the plurality of graduations to a location above a second surface of the transparent dial, wherein the projected location is closer to an operator of the vehicle than the second surface of the transparent dial, and wherein the second surface is closer than the first surface to the operator of the vehicle.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to FIGS. 1-6C of the accompanying drawings.

Figure 1:
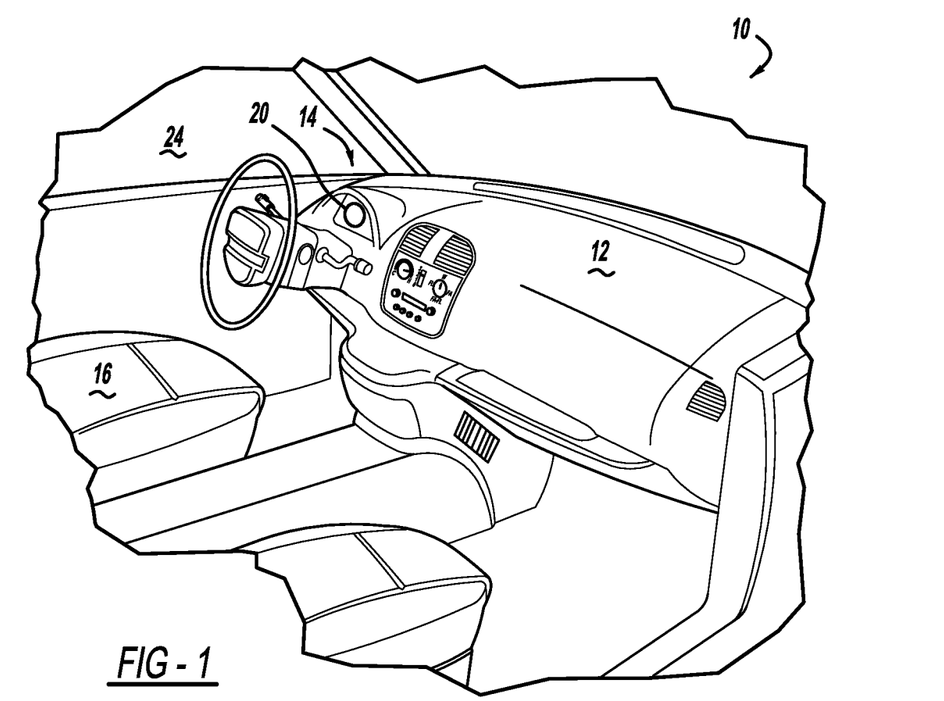
FIG. 1 is a perspective view of a vehicle interior depicting a location of an instrument in a dash.

Referring now to FIG. 1, a vehicle 10 having a dash 12 may possess an instrument cluster 14, both of which may be situated in front of a driver's seat 16 in the interior cabin 18 of vehicle 10. As part of instrument cluster 14, an instrument 20, which may also be known as a gauge, meter, or dial, is depicted. It is appreciated that instrument 20 may be exemplified with another function such as, but not limited to, a tachometer, a fuel gauge, a temperature gauge, an oil pressure gauge, etc. For purposes of this description, instrument 20 will be exemplified by a speedometer.

Figure 2:
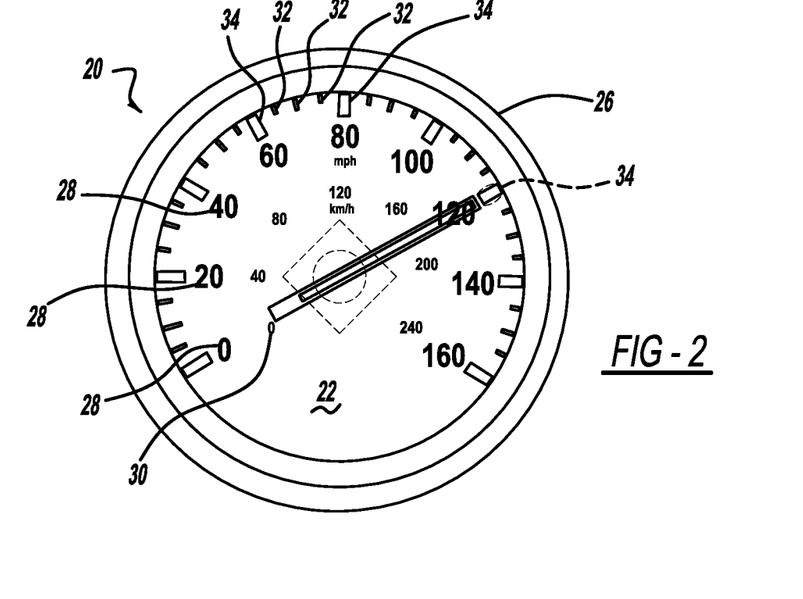
FIG. 2 is a front view of a face of an instrument.

Referring now to FIG. 2, instrument 20 may include a face 22, a pointer 24, and a housing 26, which may define an outer perimeter of instrument 20. About an outer periphery of face 22, but within the confines of housing 26, a series of major indicia 28 may be located. Major indicia 28 may indicate miles per hour ("mph") if the adopted unit of measure in a country for vehicle speed is mph. Similarly, instrument 20 may also exhibit minor indicia 30 to indicate kilometers per hour ("km/h") if an adopted auxiliary unit of measure for vehicle speed is km/h.

As depicted in FIG. 2, major indicia 28 and minor indicia 30 may be demarked on face plate using graduations. For instance, small minor graduations 32 may be placed between relatively large major graduations 34. Major graduations 34 may be used to demark speeds on face 22 every ten or twenty miles per hour from, for example, zero to 160 miles per hour. Similarly, in a country utilizing kilometers per hour, major graduations 34 may be used to demark speeds on face 22 every ten or twenty kilometers per hour from zero to 240 kilometers per hour, for example. Minor graduations 32 may be used to demark intermediate speeds not demarked by major graduations 34.

Figure 3:
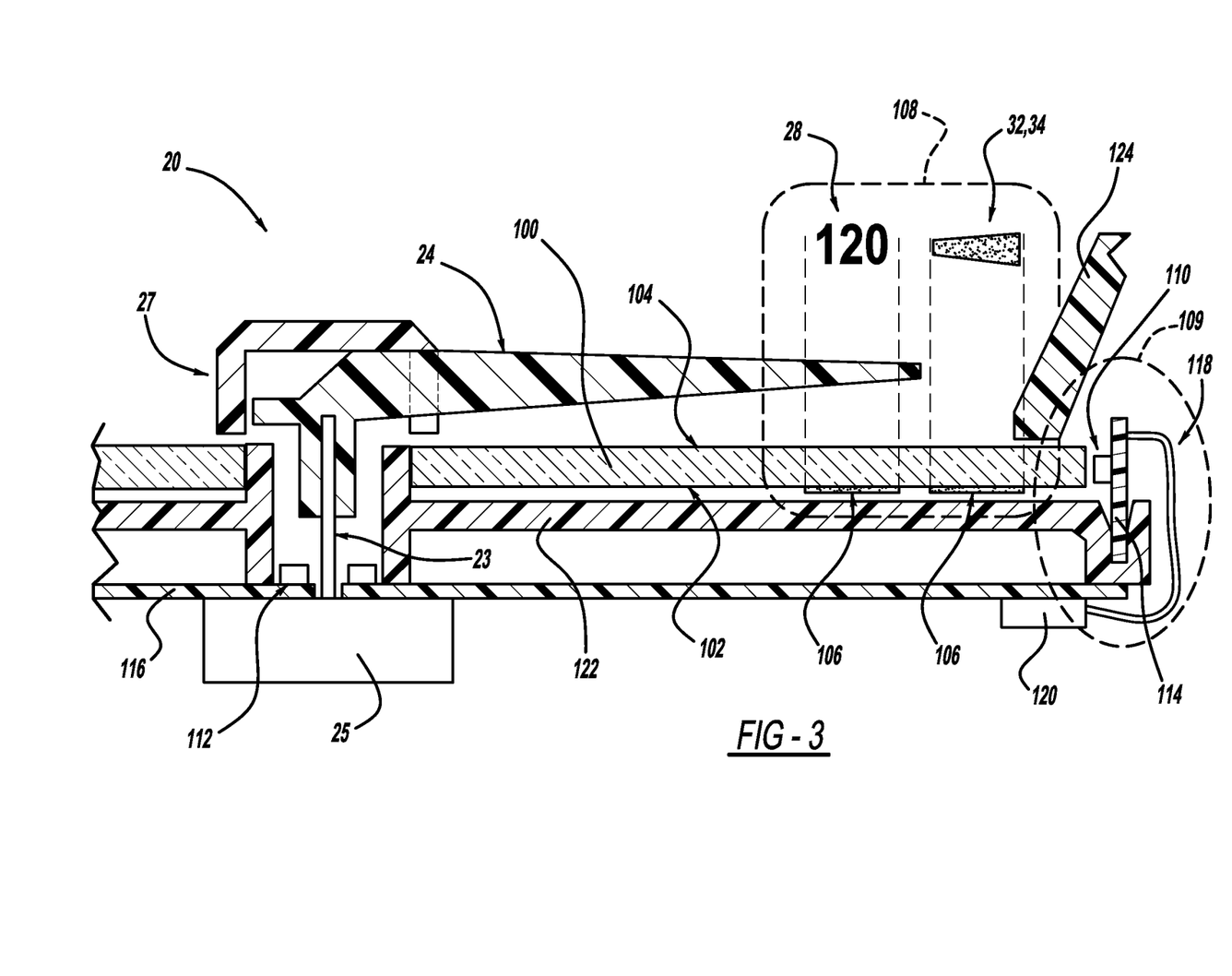
FIG. 3 is a cross-sectional view of an instrument depicting an exemplary edge lighting dial structure according to the present disclosure.

Referring now to FIG. 3, an embodiment of a transparent dial 100 of the instrument 20 is shown in more detail. The transparent dial 100 include first and second surfaces 102 and 104, respectively. More specifically, the second surface 104 may be a top surface (e.g., closer to the viewer) and the first surface 102 may be a bottom surface (e.g., further from the viewer). The transparent dial 100 may be molded in a mold from a plastic such as, but not limited to, polycarbonate or acrylic. Additionally, the material used for the transparent dial 100 is capable of undergoing a hot molding process and completely passing light.

Printing 106 may be located on the first surface 102. For example, the printing 106 may include the plurality of indicia and the plurality of graduations. For example, printing 106 is capable of being printed in ink or being painted to the first surface 102 in a color yet leave areas capable of passing light. Specifically, graduations 32, 34 may be located outboard of corresponding indicia 28, relative to a center of instrument 20. such as where the pointer 24 pivots. For example, the pointer 24 may rotate via a shaft 23 and a pivot 25. Specifically, the pivot may be located at the bottom of the instrument 20 (e.g., furthest from the viewer) to keep the pointer 24 within a predetermined range of motion. The pointer 24 may further be secured on the top of the instrument 20 (e.g., nearest to the viewer) by a cap 27.

A projection 108 of indicia 28 and/or graduations 32, 34 may be generated by reflection of light from a light source 110 off of the printing 106. For example, the light source 110 may be a light-emitting diode (LED). The light source 110, however, may also be a different type of light source. Additionally, the instrument 20 may include a plurality of light sources, and the light sources may be located at various locations (described in more detail later). For example, light source 112 may illuminate the pointer 24 at the center of the instrument 20.

Specifically, light beams from light source 110 may be directed through the transparent dial 100. In other words, some of the light beams may reflect between the first and second surfaces 102, 104 of the transparent dial 100 and some of the light beams may escape from the transparent dial 100 (e.g., these may illuminate the transparent dial 100). The projection 108 occurs when the reflected light beams in the transparent dial 100 are reflected off of the printing 106. In other words, the printing 106 may have a dark color (e.g., black) having greater reflective qualities than the other portions of the first surface 102. The light reflected off of the printing 106 may then appear nearer to the viewer (e.g., the driver of the vehicle). For example only, the projected indicia 28 and graduations 32, 34 may include "120" (e.g., speed in mph) and a major graduation, respectively.

The light source 110 may be mounted to a printed circuit board (PCB) 114. More specifically, the PCB 114 may control the light source 110. For example, the PCB 114 may control an intensity of the light beams produced by the light source 110. The instrument 20, however, may also include additional PCBs. For example, the instrument 20 may include a PCB 116 that controls the other portions of the instrument 20 (e.g., light source 112 and rotation of the pointer 24 about the pivot 25. Thus, for example only, PCB 116 may be referred to as a "main PCB" and PCB 114 may be referred to as a "sub-PCB." Additionally, PCB 114 may be connected to PCB 116 via a cable 118 and a connector 120. For example, the cable 118 and the connector 120 may provide PCB 114 with power in addition to providing for communication between PCB 114 and PCB 116. For example only, the sub-PCB 114, the main PCB 116, the cable 118, and/or the connector 120 may be collectively referred to as a "projection control device 109."

The instrument 20 may also include a case 122 and a mask 124. The case 122 may be located below the first surface 102 of the transparent dial 100 (e.g., further away from the viewer) and above the main PCB 116. The case 122 may have a light color (e.g., white). For example, the light color may be created using a resin mold and/or paint. In other words, the case 122 may be a background to the pointer 24, the transparent dial 100, the indicia 28, the graduations 32, 34, and the projection 108. More specifically, some of the light generated by light source 110 may pass out of the transparent dial 100 through the first surface 102 and then be reflected by the case 122. Therefore, the case 122 may be lighter color (e.g., white) to reflect the light back towards the viewer. In other words, the appearance of projection 108 may appear to be a shadow.

The mask 124, on the other hand, may be located outside of (i.e., outboard, or further away from the center of the instrument 20) the indicia 28 and the graduations 32, 34. The mask 124 may be opaque and thus may not allow any light beams (e.g., from light source 110 or any other light source) to pass through. Thus, the mask 124 may act as an outer shell of the instrument (e.g., a border of the transparent dial 100) and/or may hide electronic components such as the light source 110, the sub-PCB 114, the cable 118, etc.

Figure 4A:
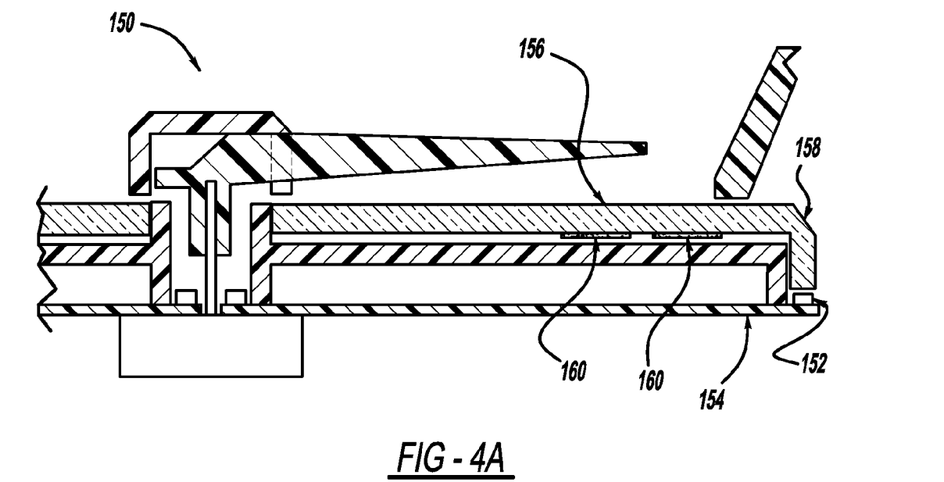
FIGS. 4A-4B are cross-sectional views of an instrument depicting exemplary light guiding structures according to the present disclosure.

Referring now to FIG. 4A, an exemplary instrument 150 includes a first embodiment of a light guiding structure 158. In other words, the light guiding structure 158 may be an alternative to the configuration shown in FIG. 3 having a light source 110 parallel to the transparent dial 100, controlled and powered by a sub-PCB 114 (e.g., via main PCB 116, connector 120, and cable 118; see FIG. 3). Therefore, the configuration shown in FIG. 3 may also be referred to as an embodiment of a light guiding structure (e.g., a third embodiment). The exemplary instrument 150, however, may be the instrument 20 (see FIGS. 2 and 3).

Specifically, the instrument 150 may include a light source 152 attached to (and thus powered and controlled by) a main PCB 154. Thus, a sub-PCB, cable, and connector may not be required. The light source 152 may project light beams into the light guiding structure 158 (e.g., in a direction perpendicular to a transparent dial 156). The light guiding structure 158 may be referred to as a "light pickup" that captures the light produced by the light source 152 and directs the light into the transparent dial 156. For example, the light pickup 158 may be an extension of the transparent dial 156 (e.g., the same material) and/or may include a reflective member (e.g., at an elbow joint, or a 45 degree angle relative to both the transparent dial 156 and the light source 152). Printing 160 may be located on a first surface (i.e., bottom surface) of the instrument 150 and may reflect the light from the light source to project the indicia and/or graduations.

Figure 4B:
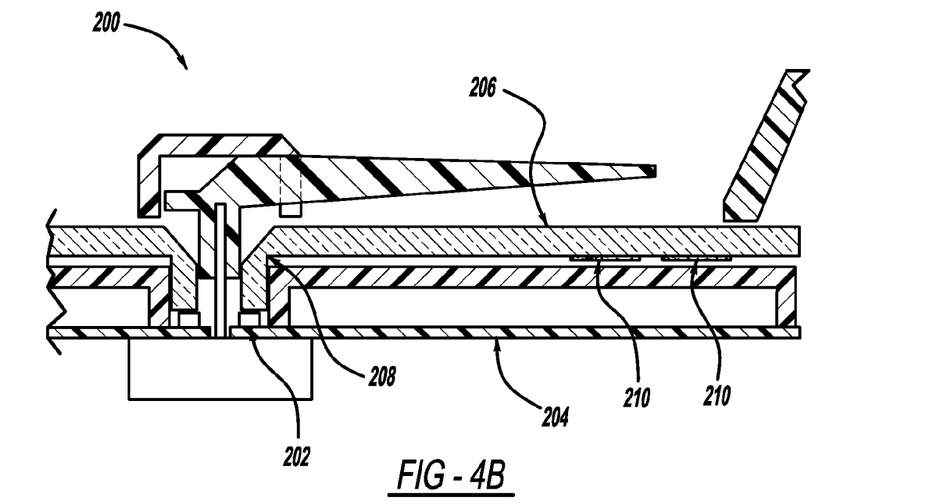

Referring now to FIG. 4B, an exemplary instrument 200 includes a second embodiment of a light guiding structure 208. For example, the exemplary instrument 200 may be the instrument 20 (see FIGS. 2 and 3). Specifically, the instrument 200 may include a light source 202 attached to (and thus powered and controlled by) a main PCB 204 (similar to FIG. 4A). The light source 202 may project light beams into the light guiding structure 208 (e.g., in a direction perpendicular to a transparent dial 206). The light guiding structure 208 may also be referred to as a "light pickup" (similar to FIG. 4A) that captures the light produced by the light source 202 and directs the light into the transparent dial 206. For example, the light pickup 208 may be an extension of the transparent dial 206

(e.g., the same material) and/or may include a reflective member (e.g., at an elbow joint, or a 45 degree angle relative to both the transparent dial 206 and the light source 202). Rather, the light pickup 208 may reflect the light in an opposite direction through the transparent dial 206 (compared to the light pickup 158 and transparent dial 156 of FIG. 4A). Printing 210 may be located on a first surface (i.e., bottom surface) of the instrument 200 and may reflect the light from the light source to project the indicia and/or graduations.

Figure 5A:
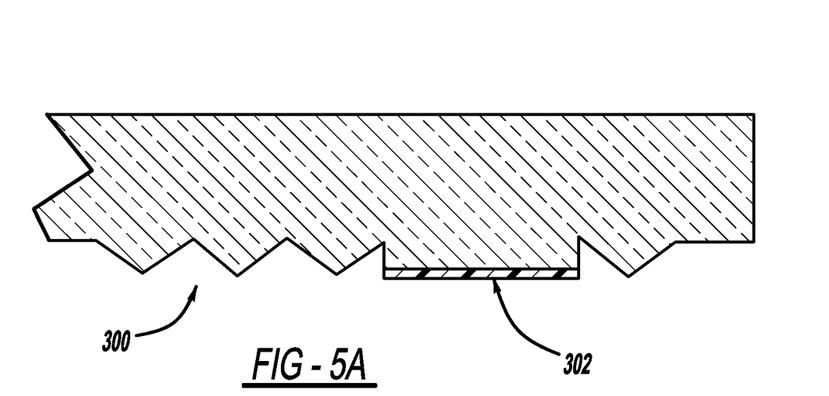
FIGS. 5A-5C are cross-sectional views of a transparent dial depicting exemplary surface textures and treatments according to the present disclosure.
Figure 5B:
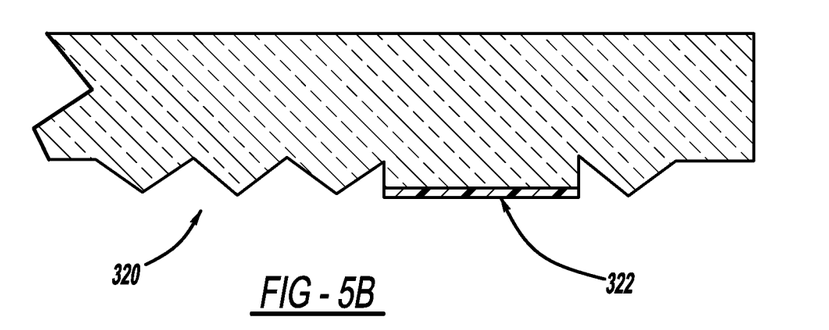
Figure 5C:
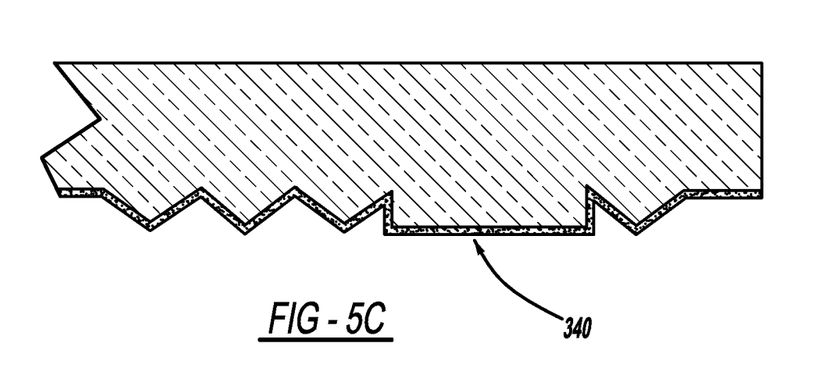

Referring now to FIGS. 5A-5C, various embodiments of a first (e.g., bottom) surface a transparent dial are shown in more detail. FIG. 5A illustrates first and second sections 300, 302 of the bottom surface (e.g., first surface 102 of FIG. 3). More specifically, the second section 302 may correspond to an area where printing resides (e.g., printing 106) and the first section 300 may correspond to all other areas.

The second section 302, therefore, may have a flat surface for improved printing and/or improved reflectivity (e.g., for projection). For example, the second section 302 may have a dark color (e.g., black) to improve readability and/or projection of the printing. The first section 300, on the other hand, may have an irregular surface. For example, the irregular surface may include concentric circular "V-shaped" grooves, radial V-shaped grooves, pyramid-shaped grooves, and/or rhombus-shaped grooves. The irregular surface, however, may also have other textures.

The first section 300 of the bottom surface may also have a light color (e.g., white) as illustrated in FIG. 5B. For example, the light colored background may improve readability (e.g., contrast) of the printing. Additionally, the second section 302 may also include the light colored background. Thus, the entire back surface may have the light colored background. The light colored background may improve reflectivity of the dark colored printing in the second section 302. Additionally, the application of a light colored background to the first section 300 (and possibly the second section 302) may be used instead of a light colored case (e.g., case 122 in FIG. 3).

For example, the light colored background may be paint. Additionally or alternatively, for example, the light colored background may be applied via plating, sputtering, deposition, or other suitable methods. Lastly, as shown in FIG. 5C, an in-mold printed sheet 340 may be applied or attached to the back surface. More specifically, the in-mold printed sheet 340 may have a texture to fit with the back surface. Additionally, the in-mold printed sheet 340 may have a light color (e.g., white) in addition to the dark color (e.g., black) printing.

Figure 6A:
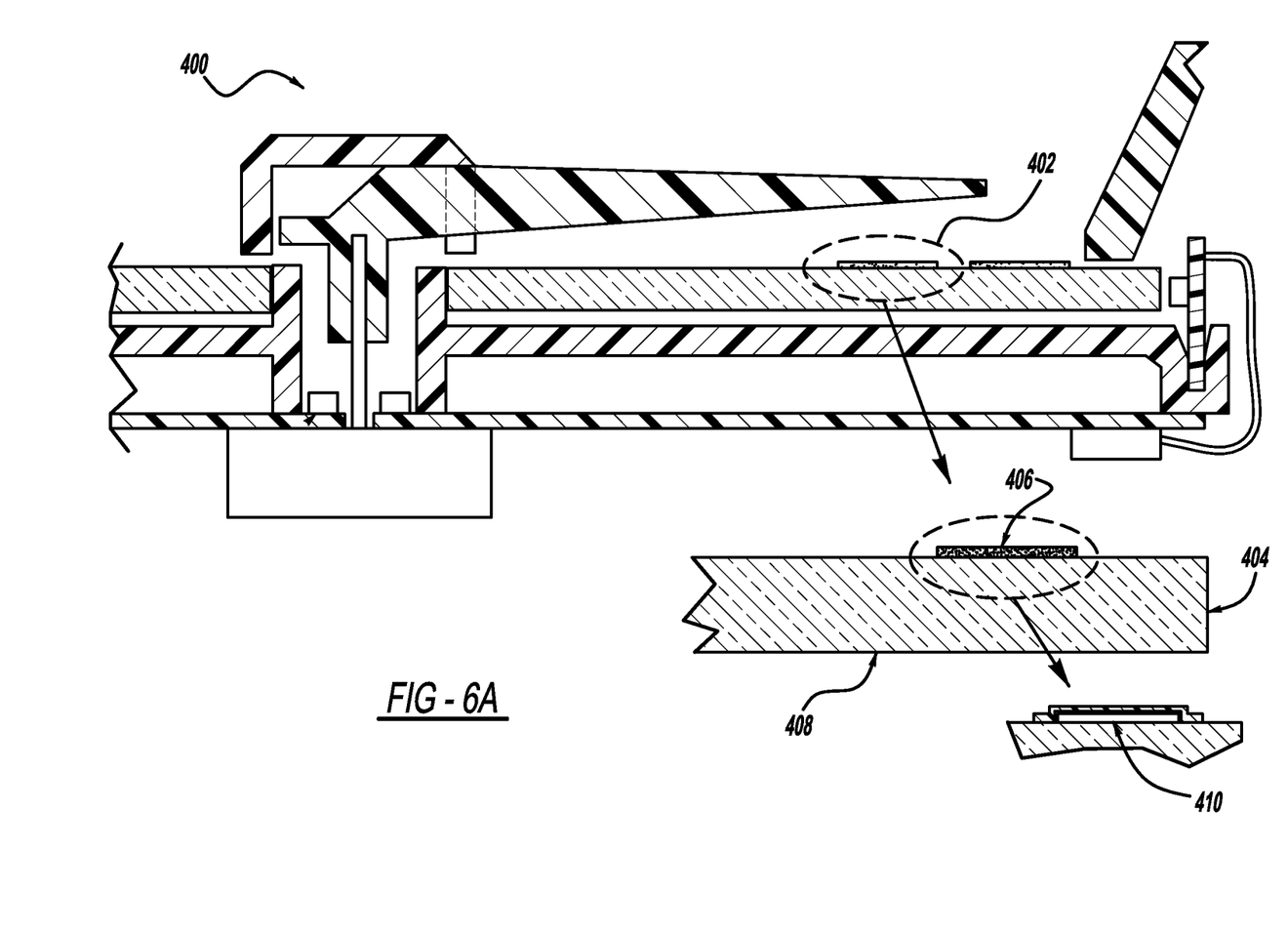
FIGS. 6A-6C are cross-sectional views of an instrument depicting exemplary illumination methods according to the present disclosure.
Figure 6B:
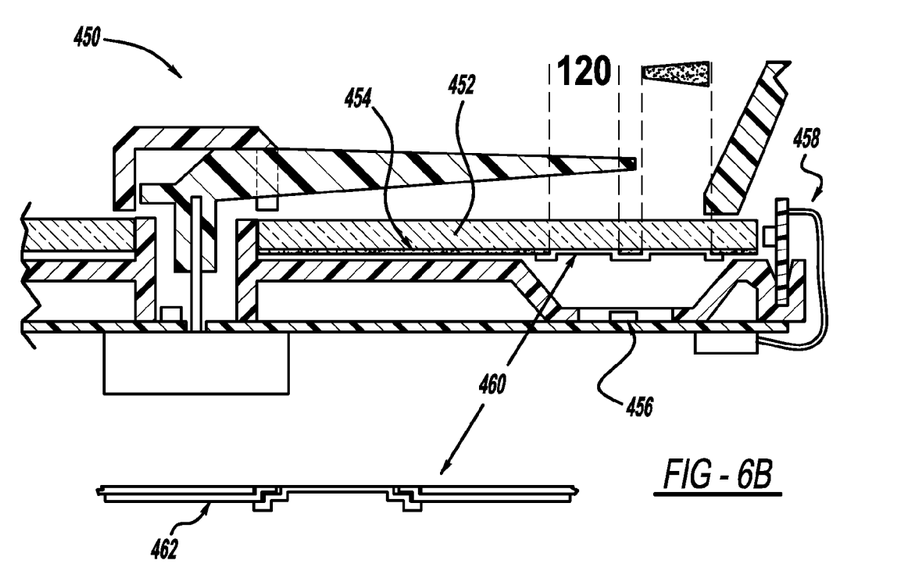
Figure 6C:
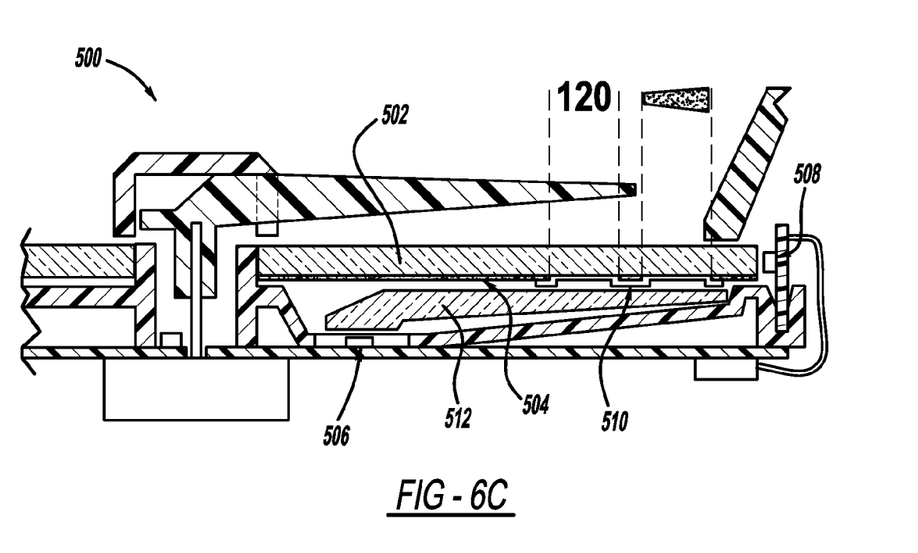

Referring now to FIGS. 6A-6C, various embodiments of illumination and projecting the indicia 28 and/or graduations 32, 34 are shown. FIG. 6A illustrates a first embodiment 400 of a transparent dial 404 having an alternative printing of the indicia and/or graduations. More specifically, FIG. 6A illustrates a printing configuration 402 that includes printing 406 on a top (e.g., second) surface of the transparent dial 404 (i.e., in contrast to a bottom, or first surface of the transparent dial 404). Additionally, the transparent dial 404 may include a mirrored or light-textured bottom surface 408 that reflects light directed into the transparent dial 404. Moreover, the printing 406 may include an additional white or light-colored layer 410 (e.g., under the printing 406) to further improve the reflective effect of the printing 406.

FIG. 6B, on the other hand, illustrates a second embodiment 450 of a transparent dial 452 having an alternative lighting and projection of the indicia and/or graduations. More specifically, the transparent dial 452 may include a white or light-colored non-transparent printing 454 on a bottom (e.g., first) surface. A light source 456 (e.g., an LED) may be located below the transparent dial 452 and may emit light towards the bottom surface of the transparent dial 452. In other words, projection of the graphics (e.g., the indicia and/or graduations) may be via this alternative light source 456. Additionally, however, an edge lighting source 458 may be implemented at an edge of the transparent dial 452 according to one of the various embodiments of the present disclosure. The printing 460 (e.g., of the indicia and/or graduations) may be a dark transparent printing. Moreover, the printing 460 may include black border printing 462 for better readability and/or to allow for the implementation of lighter colored printing 460.

Lastly, FIG. 6C illustrates a third embodiment 500 of a transparent dial 502 having an alternate light guide structure. FIG. 6C illustrates a similar structure to the second embodiment of FIG. 6B. In other words, FIG. 6C also includes a transparent dial 502 having a white or light-colored non-transparent printing 504 on a bottom (e.g., first) surface, a light source 506 below the transparent dial 502 and/or an edge lighting configuration 508 according to the present disclosure, and dark transparent printing 510 on the bottom surface of the transparent dial 502. The third embodiment 500, however, also includes an additional light guide structure 512. More specifically, the light source 506 may be configured at a different location than in FIG. 6B (e.g., closer to a center of the transparent dial 502) and thus the light guide structure 512 may steer the light from the light source 506 to project the printing 510 above the top (e.g., second) surface. Additionally, an in-mold printed dial may be implemented instead of direct white or light-colored printing 504 on the bottom surface of the transparent dial 502.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. An instrument, comprising:
   a transparent dial that includes a dark-colored indicia, a dark-colored graduation, and first and second surfaces, wherein the first and second surfaces are parallel to each other, and wherein the second surface is closer than the first surface to a viewer of the instrument;
   a light-colored case located further from the viewer than the first surface of the transparent dial; and
   a light source that provides light through the transparent dial projecting the indicia and the graduation to a location that is closer than the second surface to the viewer of the instrument; wherein
   the dark-colored indicia and the dark-colored graduation are on the first surface;
   the light-colored case forms a background for the dark-colored indicia and the dark-colored graduation;
   the light-colored case is lighter in color than the dark-colored indicia and the dark-colored graduation;
   the projection of the indicia and the graduation includes a shadow effect for the viewer of the instrument; and
   a portion of the light provided by the light source passes out of the transparent dial and is reflected an interior side of by the case such that the dark-colored indicia and the dark-colored graduation are displayed by the portion of the light that is reflected by the case.

2. The instrument of claim 1, wherein the light source is a light-emitting diode (LED).

3. The instrument of claim 1, wherein the light source is located parallel to an outer edge of the transparent dial and provides the light perpendicular to an outer edge of the transparent dial.

4. The instrument of claim 1, wherein the light source is located further than the first surface from the viewer of the instrument and projects the light perpendicular to the first and second surfaces of the transparent dial.

5. The instrument of claim 4, wherein the dark-colored indicia and the dark-colored graduation are printed on the first surface of the transparent dial using a dark transparent printing, and wherein a remainder of the first surface of the transparent dial includes a white or light non-transparent printing.

6. The instrument of claim 5, wherein the remainder of the first surface of the transparent dial includes an in-mold printed surface.

7. The instrument of claim 5, further including a light guide structure between the light source and the first surface of the transparent dial, wherein the light guide structure captures and steers the light emitted from the light source to project the dark-colored indicia and the dark-colored graduation.

8. The instrument of claim 1, wherein the light source is located at an inner edge of the transparent dial and projects the light into a light guide structure that steers the light parallel to and into the transparent dial.

9. The instrument of claim 1, wherein the light source is located at an outer edge of the transparent dial and projects the light into a light guide structure that steers the light parallel to and into the transparent dial.

10. The instrument of claim 1, wherein the first surface of the transparent dial includes first and second sections.

11. The instrument of claim 10, wherein the first section has a flat surface and includes the dark-colored indicia and dark-colored graduations.

12. The instrument of claim 10, wherein the second section has an irregular surface.

13. The instrument of claim 12, wherein the irregular surface includes at least one of concentric circular V-shaped grooves, radial V-shaped grooves, pyramid-shaped grooves, and rhombus-shaped grooves.

14. The instrument of claim 12, wherein the second section further includes a light-colored layer lighter than the dark-colored indicia and the dark-colored graduation.

15. The instrument of claim 14, wherein the light-colored layer is a white layer.

16. The instrument of claim 14, wherein the light-colored layer is applied by at least one of plating, sputtering, and deposition.

17. The instrument of claim 12, wherein the irregular surface includes an in-mold printed sheet.

18. The instrument of claim 1, wherein the instrument is located in a vehicle operated by a driver, and wherein the viewer of the instrument is the driver of the vehicle.

19. The instrument of claim 1, wherein light passing through the first surface of the transparent dial reflects off of the light-colored case and creates the shadow effect.

20. The instrument of claim 1, wherein the instrument is one of a speedometer and a tachometer.

21. An instrument located in a dash of a vehicle, comprising:
a transparent dial that includes a plurality of indicia and a plurality of graduations on a first surface of the transparent dial;
a light-emitting diode (LED) that emits light perpendicular to an outer edge of the transparent dial, wherein the LED is located at the outer edge of the transparent dial; and
a light guide structure that captures and steers the emitted light to project the plurality of indicia and the plurality of graduations to a location above a second surface of the transparent dial,
wherein the projected location is closer to an operator of the vehicle than the second surface of the transparent dial, and wherein the second surface is closer than the first surface to the operator of the vehicle.

* * * * *